United States Patent
Qu

(12) United States Patent (10) Patent No.: US 7,257,459 B1
Qu (45) Date of Patent: Aug. 14, 2007

(54) METHOD AND APPARATUS FOR SCHEDULING PILOT LOTS

(75) Inventor: Peng Qu, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 0 days.

(21) Appl. No.: 11/616,710

(22) Filed: Dec. 27, 2006

(51) Int. Cl.
*G06F 19/00* (2006.01)
(52) U.S. Cl. ...................... 700/121; 700/101
(58) Field of Classification Search ............. 700/28, 700/31, 44, 100, 101, 103, 121, 173
See application file for complete search history.

(56) References Cited

U.S. PATENT DOCUMENTS

| | | | | |
|---|---|---|---|---|
| 6,148,239 A * | 11/2000 | Funk et al. | | 700/1 |
| 6,248,602 B1 * | 6/2001 | Bode et al. | | 438/14 |
| 6,427,093 B1 * | 7/2002 | Toprac | | 700/121 |
| 7,181,354 B1 * | 2/2007 | Bone et al. | | 702/84 |
| 7,200,459 B1 * | 4/2007 | Bode et al. | | 700/121 |
| 2007/0078556 A1 * | 4/2007 | Stirton et al. | | 700/108 |

* cited by examiner

*Primary Examiner*—Leo Picard
*Assistant Examiner*—Chad Rapp
(74) *Attorney, Agent, or Firm*—Williams, Morgan & Amerson, P.C.

(57) ABSTRACT

A method includes identifying a queue of workpiece lots awaiting processing in a process tool. At least one of the workpiece lots is associated with an obsolete control thread for controlling the process tool. Each of the plurality of workpiece lots is modeled as a parent lot and a child lot. A completion time for the workpiece lots is optimized by selecting a processing order of the workpiece lots and designating one of the child lots associated with the obsolete control thread as a pilot lot. A first workpiece lot in the selected processing order is processed in the process tool.

28 Claims, 3 Drawing Sheets

METHOD AND APPARATUS FOR SCHEDULING PILOT LOTS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to manufacturing and, more particularly, to a method and apparatus for scheduling pilot lots.

The technology explosion in the manufacturing industry has resulted in many new and innovative manufacturing processes. Today's manufacturing processes, particularly semiconductor manufacturing processes, call for a large number of important steps. These process steps are usually vital, and therefore, require a number of inputs that are generally fine-tuned to maintain proper manufacturing control.

The manufacture of semiconductor devices requires a number of discrete process steps to create a packaged semiconductor device from raw semiconductor material. The various processes, from the initial growth of the semiconductor material, the slicing of the semiconductor crystal into individual wafers, the fabrication stages (e.g., etching, doping, ion implanting, or the like), to the packaging and final testing of the completed device, are so different from one another and specialized that the processes may be performed in different manufacturing locations that contain different control schemes.

Generally, a set of processing steps is performed across a group of semiconductor wafers, sometimes referred to as a lot. For example, a process layer that may be composed of a variety of different materials may be formed across a semiconductor wafer. Thereafter, a patterned layer of photoresist may be formed across the process layer using known photolithography techniques. Typically, an etch process is then performed across the process layer using a patterned layer of photoresist as a mask. This etching process results in the formation of various features or objects in the process layer. Such features may be used as, for example, a gate electrode structure for transistors. Many times, trench isolation structures are also formed across the substrate of the semiconductor wafer to isolate electrical areas across a semiconductor wafer. One example of an isolation structure that can be used is a shallow trench isolation (STI) structure.

The manufacturing tools within a semiconductor manufacturing facility typically communicate with a manufacturing framework or a network of processing modules. Each manufacturing tool is generally connected to an equipment interface. The equipment interface is connected to a machine interface to which a manufacturing network is connected, thereby facilitating communications between the manufacturing tool and the manufacturing framework. In some cases, the machine interface can generally be part of an advanced process control (APC) system. The APC system initiates a control script, which can be a software program that automatically retrieves the data needed to execute a manufacturing process.

An APC process control strategy allows a high degree of process control, desirably on a run-to-run basis, with a moderate amount of measurement data. In this control strategy, a model of a process or of a group of interrelated processes is established and implemented in an appropriately configured process controller. The process controller also receives information which may include pre-process measurement data and/or post-process measurement data, as well as information related, for instance, to the substrate history, such as type of process or processes, the product type, the process tool or process tools in which the products are to be processed or have been processed in previous steps, the process recipe to be used, i.e., a set of required steps for the process or processes under consideration, wherein possibly fixed process parameters and variable process parameters may be contained, and the like.

From this information and the process model, the process controller determines a controller state or process state that describes the effect of the process or processes under consideration on the specific product, thereby permitting the establishment of an appropriate parameter setting of the variable parameters of the specified process recipe to be performed with the substrate under consideration, wherein tool-specific internal or "low-rank" control units (substantially) maintain the parameter values, such as flow rates, temperatures, exposure doses and the like, at the targets specified by the APC controller.

Thus, the APC controller may have a predictive behavior, whose accuracy may depend on the amount of measurement data and its timeliness with respect to the current process run. The measurement data, however, may stem from different process tools performing equivalent processes.

To address the multiple tool, multiple process, and multiple product issues arising in a complicated fabrication facility, process control activities are sometimes organized into control threads. A particular control thread refers to a series of process steps that are to be performed by a specific processing tool or by a specific set of processing tools. Distinct control threads are defined for different tool, process, reticle, and/or product combinations as deemed appropriate. Incoming metrology data is associated with a particular thread, and control actions are determined for the thread to generate the process recipe or other production related parameters.

For a particular control thread to be effective in controlling a tool or process, the metrology data provided to the thread should be recent and regular. The age of the metrology data for the thread directly affects the quality of the process control. In some cases, a control thread may become obsolete if it has not received metrology data for a predetermined period of time (e.g., 2-3 days).

Prior to processing selected lots, the control system determines if the associated control thread is active. If the control thread is obsolete, a few wafers will be split out from the parent lot to form a pilot lot that will be processed and qualified prior to running the other lots associated with the obsolete thread through production. After piloting and validation, the piloting wafers may be merged back with the parent lot and continue the remaining process. They may also be kept as engineering wafers and permanently split from the parent lot for future engineering purposes. All other lots associated with the obsolete control thread are held until the thread is re-validated after measurement results from metrology operations are accepted.

Meanwhile, the tool may still process lots of mature threads after applying necessary setups (or no setup if lots waiting in the queue are of the same thread as the current recipe setup on the tool). If there are no other lots associated with active threads waiting in the queue, the tool is idle. From a tool capacity perspective, pilot lots cause capacity loss due to the potential holds or setup changes. If the tool is a production bottleneck, such capacity loss is not recoverable. Even though tools may be occupied by processing other lots with active threads, capacity loss may still occur as the result of the required setup changes.

From a fabrication perspective, pilot lots have an impact on the balancing of the production line. Delaying the dispatch of a pilot lot may result in the lots associated with the obsolete thread to accumulate in front of the tool and cause the production line to become unbalanced.

Current techniques for processing pilot lots include assigning a high priority to the pilot lot to reduce the time that the thread is idle. However, such a technique can potentially disrupt the flow of other products being processed that have to compete with the pilot lot on the basis of priority. Hence, a need exists to determine the best time to dispatch pilot lots so that process control, machine capacity, and production work-in-progress (WIP) remain well balanced.

This section of this document is intended to introduce various aspects of art that may be related to various aspects of the present invention described and/or claimed below. This section provides background information to facilitate a better understanding of the various aspects of the present invention. It should be understood that the statements in this section of this document are to be read in this light, and not as admissions of prior art. The present invention is directed to overcoming, or at least reducing the effects of, one or more of the problems set forth above.

BRIEF SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

One aspect of the present invention is seen in a method for scheduling workpieces. The method includes identifying a queue of workpiece lots awaiting processing in a process tool. At least one of the workpiece lots is associated with an obsolete control thread for controlling the process tool. Each of the plurality of workpiece lots is modeled as a parent lot and a child lot. A completion time for the workpiece lots is optimized by selecting a processing order of the workpiece lots and designating one of the child lots associated with the obsolete control thread as a pilot lot. A first workpiece lot in the selected processing order is processed in the process tool.

Another aspect of the present invention is seen in a system including a process tool and a scheduling unit. The process tool is operable to process a workpiece. The scheduling unit is operable to identify a queue of workpiece lots awaiting processing in the process tool, at least one of the workpiece lots being associated with an obsolete control thread for controlling the process tool, model each of the plurality of workpiece lots as a parent lot and a child lot, optimize a completion time for the workpiece lots by selecting a processing order of the workpiece lots and designating one of the child lots associated with the obsolete control thread as a pilot lot, and direct the process tool to process a first workpiece lot in the selected processing order.

BRIEF DESCRIPTION OF THE SEVERAL VIEWS OF THE DRAWINGS

The invention will hereafter be described with reference to the accompanying drawings, wherein like reference numerals denote like elements, and.

Figure 1:
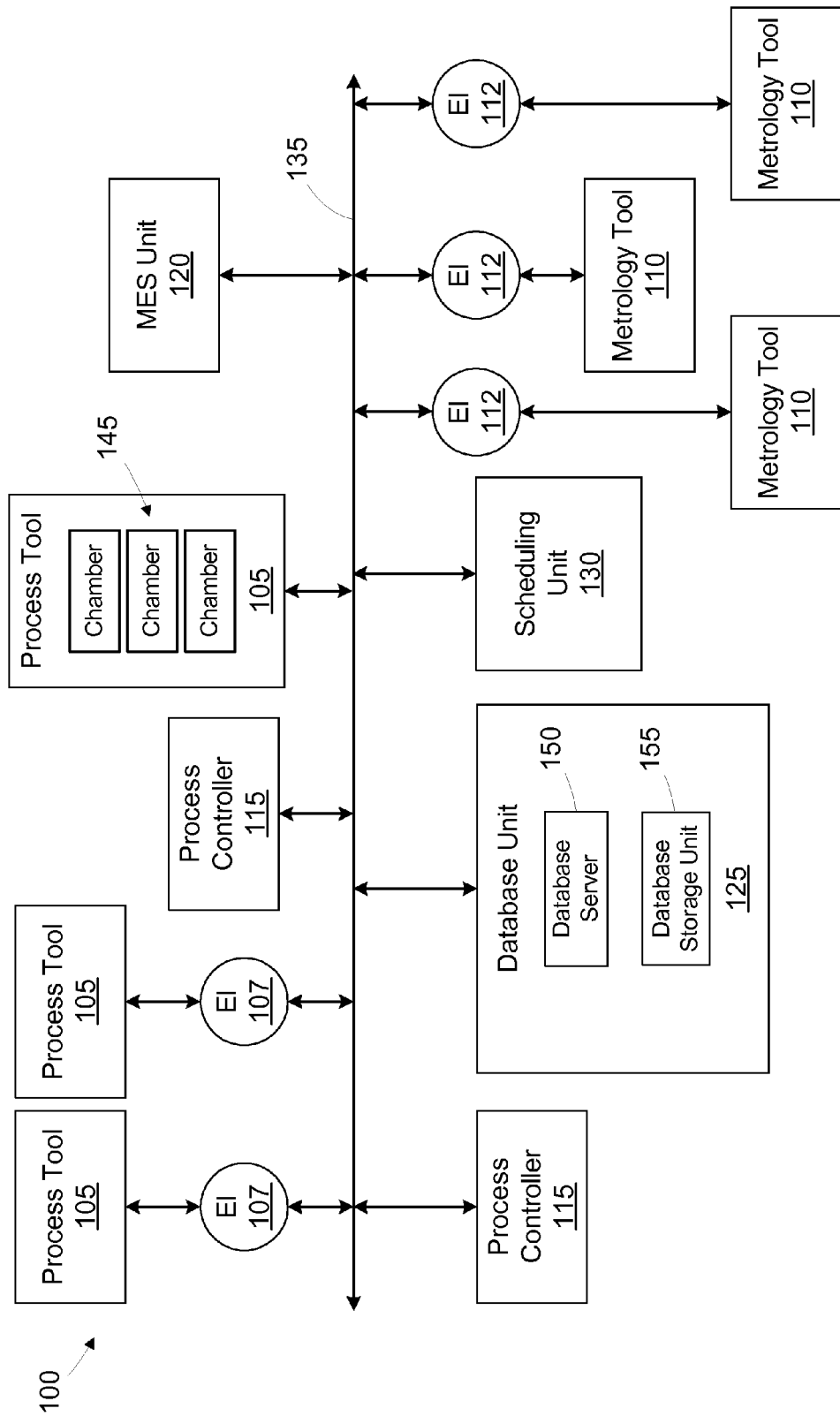
FIG. 1 is a simplified block diagram of a manufacturing system in accordance with one illustrative embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

One or more specific embodiments of the present invention will be described below. It is specifically intended that the present invention not be limited to the embodiments and illustrations contained herein, but include modified forms of those embodiments including portions of the embodiments and combinations of elements of different embodiments as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the present invention unless explicitly indicated as being "critical" or "essential."

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or CDROM), and may be read only or random access. Similarly, the transmission medium may be twisted wire pairs, coaxial cable, optical fiber, wireless or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Referring now to the drawings wherein like reference numbers correspond to similar components throughout the several views and, specifically, referring to FIG. 1, the present invention shall be described in the context of an illustrative manufacturing system 100. The manufacturing system 100 includes process tools 105, metrology tools 110, process controllers 115, a manufacturing execution system (MES) unit 120, a database unit 125, a scheduling unit 130, and a network 135. The various entities in the manufacturing system 100 may be implemented using software components, hardware components, firmware components, and/or a combination thereof. As described in greater detail below, the scheduling unit 130 selects pilot lots for processing to supply metrology data for obsolete control threads.

In the illustrated embodiment, the manufacturing system 100 is adapted to fabricate semiconductor devices. Although the invention is described as it may be implemented in a semiconductor fabrication facility, the invention is not so limited and may be applied to other manufacturing environments. The techniques described herein may be applied to a variety of workpieces or manufactured items, including, but not limited to, microprocessors, memory devices, digital signal processors, application specific integrated circuits (ASICs), or other devices. The techniques may also be applied to workpieces or manufactured items other than semiconductor devices. Generally, the techniques may be applied to any type of measured data to allow conversion of continuous data into a binary format.

The entities in the manufacturing system 100 communicate within a manufacturing framework or a network 135 of processing modules. The network 135 interconnects various components of the manufacturing system 100, allowing them to exchange information. To facilitate communication with the network 135, the process tools 105 may have associated equipment interfaces 107, and the metrology tools 110 may have associated equipment interfaces 112. The equipment interfaces 107, 112 serve as a bridge between the associated tool 105, 110 and the network 135 to translate commands and data from the tool specific protocol to a network protocol. Although shown as separate entities, the equipment interfaces 107, 112 may be integrated into the respective tools 105, 110.

A particular wafer or lot of wafers progresses through the process tools 105 as it is being manufactured, wherein each tool 105 may perform a specific function in the process flow. Some of the process tools 105 may include a plurality of chambers 145, each of which may process wafers and may be controlled collectively or individually. Exemplary process tools 105 for a semiconductor device fabrication environment include photolithography steppers, etch tools, deposition tools, polishing tools, rapid thermal processing tools, implantation tools, etc. An actual implementation of the manufacturing system 100 includes many more process tools 105 than those illustrated in FIG. 1, and typically multiple tools of each type are present.

Exemplary metrology tools 110 include, but are not limited to, film measurement devices, scanning electron microscopes, optical review tools, electrical test tools, scatterometry tools etc. Again, an actual implementation includes many metrology tools 110. The metrology tools 110 may measure various parameters associated with the processing of the wafers in the manufacturing system 100, including physical data regarding the processed wafers, such as feature dimensions, process layer thickness, surface profile, etc., or performance data, such as speed, yield, power consumption, etc.

The process controllers 115 determine control actions to control various operations of selected process tools 105 which may be based, at least in part, on metrology data collected by the metrology tools 110 during the fabrication of wafers. The process controllers 115 process multiple control threads for determining control actions for updating the operating recipe of the associated process tool 105. Generally, a control thread is defined for a unique combination of entities in the manufacturing system 100. For example, control threads may be defined for different process tool, product, reticle, or process combinations.

The particular control models used by the process controllers 115 depend on the type of process tool 105 being controlled, and the particular metrology data collected for use in conjunction with the control models depends on the feature being formed by the particular process tool 105. The control models may be developed empirically using commonly known linear or non-linear techniques. The control models may be relatively simple equation-based models (e.g., linear, exponential, weighted average, etc.) or more complex models, such as a neural network model, a principal component analysis (PCA) model, or a partial least squares projection to latent structures (PLS) model. The specific implementation of the control models may vary depending on the modeling techniques selected and the process being controlled. The selection and development of the particular control models is within the ability of one of ordinary skill in the art, and accordingly, the control models are not described in greater detail herein for clarity and to avoid obscuring the instant invention.

An exemplary process control scenario involves the control of a gate electrode critical dimension (CD) in a transistor structure. Various processes and process variables may be controlled to affect the gate electrode CD. For example, a photoresist mask formed by a photolithography tool is used to pattern the gate electrode. The photolithography processes used to form the mask may affect the dimensions of the pattern and thus the dimensions of the gate electrode formed by an etch process using the mask. Exposure time and energy may be controlled to affect the dimensions of the mask. The parameters (e.g., etch time, plasma power, etch gas makeup and concentration, etc.) of the etch process may also affect the CD of the completed gate electrode and may be controlled by a process controller 115. The processes and variables described above that affect the gate electrode CD are not exhaustive. Other processes may be performed that have an impact of the CD and other variables of those processes may be controlled.

The MES unit 120 directs the high level operation of the manufacturing system 100. The MES unit 120 monitors the status of the various entities in the manufacturing system 100 (i.e., lots, tools 105, 110). The database unit 125 is provided for storing a plurality of types of data, such as manufacturing-related data (e.g., pre-process and post process metrology data), data related to the operation of the system 100 (e.g., the status of the tools 105, 110 the status and priorities of semiconductor wafers, etc.). The database unit 125 may store tool state data relating to a plurality of process runs performed by the process tools 105. The database unit 125 may include a database server 150 for storing tool state data and/or other manufacturing data related to processing of wafers into a database storage unit 155.

The MES unit 120 stores information in the database unit 125 related to the particular tools 105, 110 (i.e., or sensors (not shown) associated with the tools 105, 110) used to process each lot of wafers. Sensor data stored for the process tools 105 may include chamber pressure, chamber temperature, anneal time, implant dose, implant energy, plasma energy, processing time, etc. Data associated with the operating recipe settings used by the process tool 105 during the fabrication process may also be stored in the database unit 125. For example, it may not be possible to measure direct values for some process parameters. These settings may be determined from the operating recipe in lieu of actual process data from the process tool 105.

Figure 2:
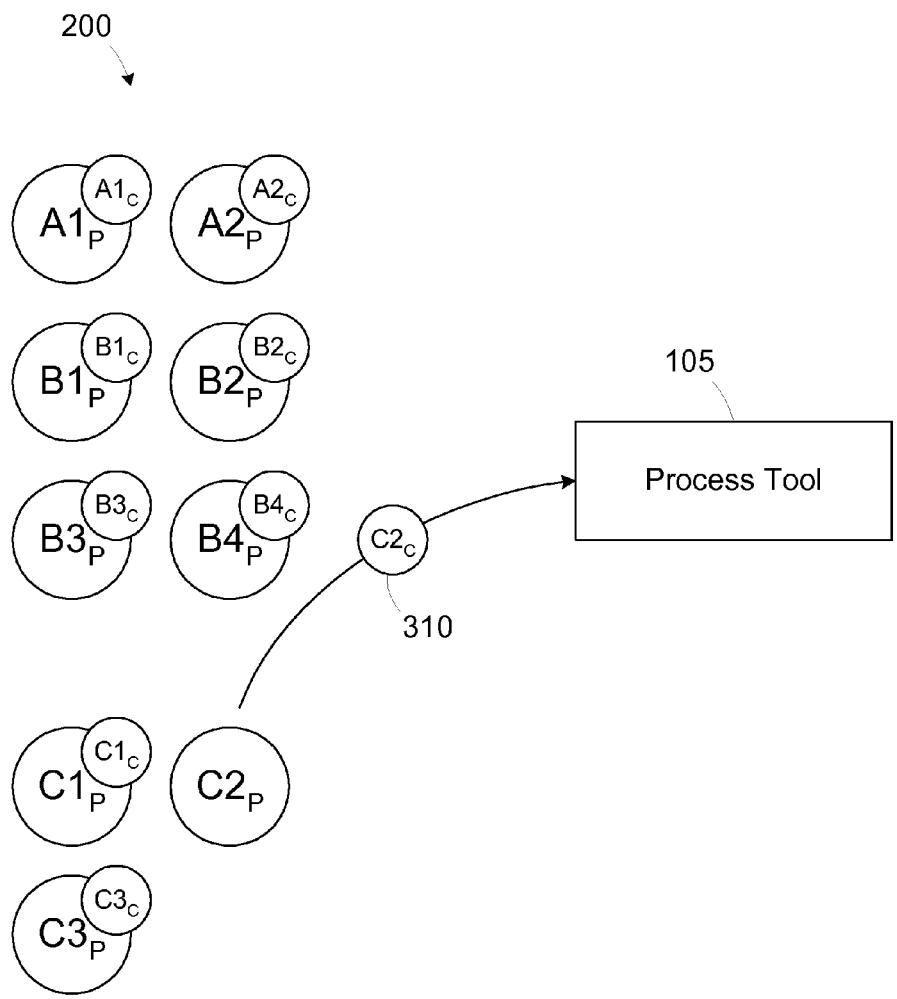
FIG. 2 is a simplified block diagram illustrating a processing queue for a selected process tool in the system of FIG. 1.

Turning now to FIG. 2, a diagram illustrating a queue 200 associated with one of the process tools 105 of FIG. 1 is provided. The queue 200 represents wafer lots waiting to be processed by the tool 105 or other similar process tools of the same type. The letter designation of each lot A, B, or C indicates the control thread associated with the particular lot. For example, control threads A, B, and C are represented by the lots in the queue 200. The actual number of control threads maybe much higher in an actual implementation. For purposes of the following illustration, threads A and B represent active threads, while thread C represents a obsolete thread for which metrology data has not been received within a predetermined time window (e.g., 3 days).

The scheduling unit 130 in FIG. 1 employs a linear mixed-integer programming model for selecting pilot lots. In selecting various lots for processing, the scheduling unit 130 seeks to optimize the overall completion time, thereby reducing throughput losses due to idle time and/or setup delays. In such an optimization based approach, solutions are driven by a plurality of objectives. Constraints are defined that serve as conditions to narrow down the solution scope. With a commercially or publicly available solver, a linear (either integer or non-integer) solution can be identified within the solution scope. For example, the OSL solver offered by IBM, Corporation is a commercially available software tool that may be used. For purposes of the following description, the following notation list provided in Table 1 identifies symbols used in the following objective and constraint equations.

TABLE 1

Notation

Set:

| | |
|---|---|
| J | Set of lots |
| T | Set of types |

Parameters

| | |
|---|---|
| $\lambda_j$ | Type of lot $j \in J$, $\lambda_j \in T$ |
| $f_j$ | Flag of lot $j \in J$. $f_j = 1$ if lot $j$ is the Child lot that may be used as a pilot entity |
| $f'_j$ | Flag of lot $j \in J$. $f'_j = 1$ if lot $j$ is the parent lot whose child lot may be used as a pilot entity |
| $q_j$ | Number of wafers in lot $j \in J$ |
| $p_t$ | Unit processing time of lots of type $t \in T$ |
| $\phi_t$ | Unit test delay of pilot lots of type $t \in T$ |
| $S_{m,n}$ | Sequence dependent setup time from type $m \in T$ to type $n \in T$ |
| $\mu$ | Current setup on the machine. Assume that only lots of the same type with current machine setup do not need pilot |
| $\eta_j$ | Original lot id of lot $j \in J$ before split |
| M | Large positive number to make constraints feasible |

Variables

| | |
|---|---|
| $C_j$ | Completion time of lot $j \in J$. $C_j > 0$ |
| $\sigma_j$ | Disjunctive arcs from dummy node to lot $j \in J$. |
| $X_{i,j}$ | Binary decision variable. =1 if lot $i \in J$ is scheduled before lot $j \in J$ |
| $C_{max}$ | Makespan (maximum completion time) |
| $Y_j$ | Binary. =1 if lot $j \in J$ is the pilot |

The objective function employed by the scheduling unit 130 is:

$$\text{Min } C_{max} \quad (1)$$

The scheduling unit 130 minimizes the maximum completion time (makespan), thereby optimizing throughput.

For purposes of the optimization, the scheduling unit 130 treats each lot as a combination of a parent lot and a child lot, as indicated by the P and C subscripts associated with the lots illustrated in FIG. 2. Hence, every lot is eligible to be selected as the pilot lot. The size of the child lots is fixed at a predetermined constant value (e.g., 3 wafers) which may vary depending on the particular implementation. The remaining wafers in a given lot are assigned to the parent lot. The output of the optimization identifies a single pilot lot to be sent ahead of the other lots associated with the same thread, such as the lot $C2_C$ shown in FIG. 2. For the lot selected as the pilot lot, there is no tie between the two sub-lots (i.e., parent lot and child lot), so they can be scheduled separately to achieve better throughput. For other lots not picked as the pilot lot, constraints are provided to force the parent and child lots to be processed together.

A first constraint is defined that provides for the lot completion time always being greater than the total processing time plus delays arising from sequence dependent steps.

$$C_j \geq q_j p_{\lambda j} + s_{\mu,\lambda j} \quad \forall j \in J \quad (2)$$

In the illustrated embodiment, the scheduling unit 130 employs a disjunctive graph modeling approach. The following constraints ensure the existence of a unique arc between two nodes. In other words, between two lots there is only one sequencing relationship.

$$\sum_{j \in J, j \neq i} X_{i,j} \leq 1 \quad \forall i \in J \quad (3)$$

$$\sum_{i \in J, i \neq j} X_{i,j} \leq 1 \quad \forall j \in J \quad (4)$$

$$X_{i,j} + X_{j,i} \leq 1 \quad \forall i, j \in J, i \neq j \quad (5)$$

Another constraint relates to the number of process tools 105 (σ). This constraint ensures that the maximum number of arcs connected to the dummy starting node is the same as or less than the number of machines.

$$\sigma_j \geq 1 - \sum_{i \in J, i \neq j} X_{i,j} \quad \forall j \in J \quad (6)$$

For ease of illustration, the example is provided as a single machine problem.

$$\sum_{i \in J} \sigma_i = 1 \quad (7)$$

The following equation indicates that the difference between the completion times of two lots must be greater than or equal to the processing time (i.e., the number of wafer times the unit processing time) plus the setup time minus an ordering constant.

$$C_j - C_i \geq q_j p_{\lambda j} + s_{\lambda i,\lambda j} - M(1 - X_{i,j}) \quad \forall i, j \in J, i \neq j \quad (8)$$

The ordering constant, M, is a large integer that is used to enforce the feasibility of the equation. If lot i is scheduled before lot j, $X_{i,j}=1$, the difference in completion times between lot j and lot i is a function of the processing time and the setup times (i.e., the M term goes to zero). If lot j is scheduled before lot i, $X_{i,j}=0$, the difference in completion times between lot j and lot i is dominated by the M term, and is easily satisfied, as it is a large negative number.

If a child lot is not designated as a pilot lot (e.g., the child lots are of the active threads), its pilot flag is set to 0.

$$Y_j=0 \quad \forall j \in J, f_j=0 \quad (9)$$

If a lot requires the same recipe as configured on the process tool 105, it usually means that the process tool 105 is qualified for the thread associated with the lot. The lot will thereby not be selected as a pilot lot, as it is assumed that the control thread information is still up-to-date (i.e., the control thread is active).

$$Y_j=0 \quad \forall j \in J, \lambda_j=0 \quad (10)$$

Within the optimization, it is assumed that one lot is sufficient to re-validate the thread. Therefore it is assumed that only one lot can be selected as the pilot lot. In reality, it is possible that one lot may not be able to provide sufficient information to qualify the thread. In that situation, the optimization model is re-run to determine a new pilot/dispatching strategy.

$$\sum_{j \in J} Y_j = 1 \quad \forall j \in J, \lambda_j \neq \mu \quad (11)$$

If a lot i is selected as a pilot lot, $Y_i$ will have a value of 1. The flag, $f_i$, is the parameter indicating whether the lot is a child lot. If the child lot has been selected as the pilot lot, it can be scheduled separately with respect to the remaining wafers. The following equation provides a completion time constraint for the pilot lot and non-pilot lots.

$$C_j \geq C_i + q_j p_{\lambda,i} + s_{\lambda i,\lambda,i} + q_i \phi_{\lambda,i} - M(1-Y)$$

$$\forall i, j \in J, i \neq j, \lambda_i = \lambda_j, f_i=1, f_j=0, f'_i=0 \quad (12)$$

As may be observed from the condition section of Equation 12, if $f_i=1$ (i.e., lot i is a child lot) and $f_j=0$ (i.e., lot j is not the pilot lot), there are two possible scenarios. One scenario is that lots i and j belong to the same lot and are the parent and child components of the same lot. The other scenario is that lot i is a child lot for one lot and lot j is a child lot that cannot be used as a pilot. As both lot i and lot j are of the same product type (or recipe), they cannot be processed unless there is an active control thread running on the machine. As only lot i can potentially be used as a pilot, the M factor will be zero due to $(1-Y_i)$. Under this situation, the completion time of lot j has to be after lot i as lot j cannot be processed until the child lot of lot i (i.e., the pilot lot) is complete. With that, $C_j$ is always greater than the completion time of lot i plus the processing of lot j and the setup time. If lot i is not used as the pilot lot, the completion time of lot j will be greater than a big negative value due to the dominating M factor, which is always feasible.

Another constraint attempts to ensure a valid sequence by addressing the situation where two sub-lots belong to the same lot (i.e., parent and child of the same lot). If the child lot of a particular lot is not a pilot, it is processed with its parent lot. If the child is a pilot, the parent is processed after the child.

$$X_{i,j} \geq 1 - MY_i$$

$$\forall i, j \in J, i \neq j, \lambda_i = \lambda_j, f_i=1, f_j=0, f'_i=0, f'_j=1, \eta_i=\eta_j \quad (13)$$

If lot i is used as a pilot lot, lot i can be scheduled immediately before lot j, the parent lot. However, lot j need not necessarily immediately follow lot i, as a different lot may be processed between lots i and j. Hence, $X_{i,j}$ can be either zero or one. However, if lot i is not a pilot lot, lots i and j should not be split as they should be processed as one lot. In this situation, lot i has to be scheduled before lot j. Hence, $X_{i,j}$ is greater than or equal to 1, which means $X_{i,j}=1$.

The following constraint is applied as a means of calculating the maximum completion time, makespan, for all lots to be used in the objective function.

$$C_{max} \geq C_j \quad \forall j \in J \quad (14)$$

$$C_j, \sigma_j \geq 0 \quad \forall j \in J$$

The output of the mixed integer linear program optimization using the previously described objectives and constraints is a processing order and designated pilot lot that seeks to maximize throughput of the associated process tool 105. The scheduling unit 130 directs the process tool 105 to process the first lot in the determined processing order. That lot may be the pilot lot or may be another lot not associated with the obsolete control thread. In the case where the first lot is the pilot lot, the remaining lots in the parent and all other lots associated with the obsolete control thread are placed on hold until the thread can be updated. In the case where, the first lot is not the pilot lot, the parent lot and child lot defined as separate entities for the optimization are processed as a single entity. The scheduling unit 130 may run the optimization at fixed intervals to generate a schedule that is followed for a predetermined number of runs of the process tool 105. Alternatively, the scheduling unit 130 may execute the optimization prior to each dispatching decision to react to changes in the current queue.

Among the workpiece lots, a lot associated with an obsolete thread may not always be present. If no such lot exists, parameters $f_j$ and $f'_j$ will be set to zero for the lots indicating, no piloting lot is required. The scheduling problem may still be resolved using the linear mixed-integer programming model described above in a simplified manner. Should a lot associated with an obsolete thread exist, parameters $f_j$ and $f'_j$ are set accordingly, and the optimization may be executed to designate a pilot lot.

Figure 3:
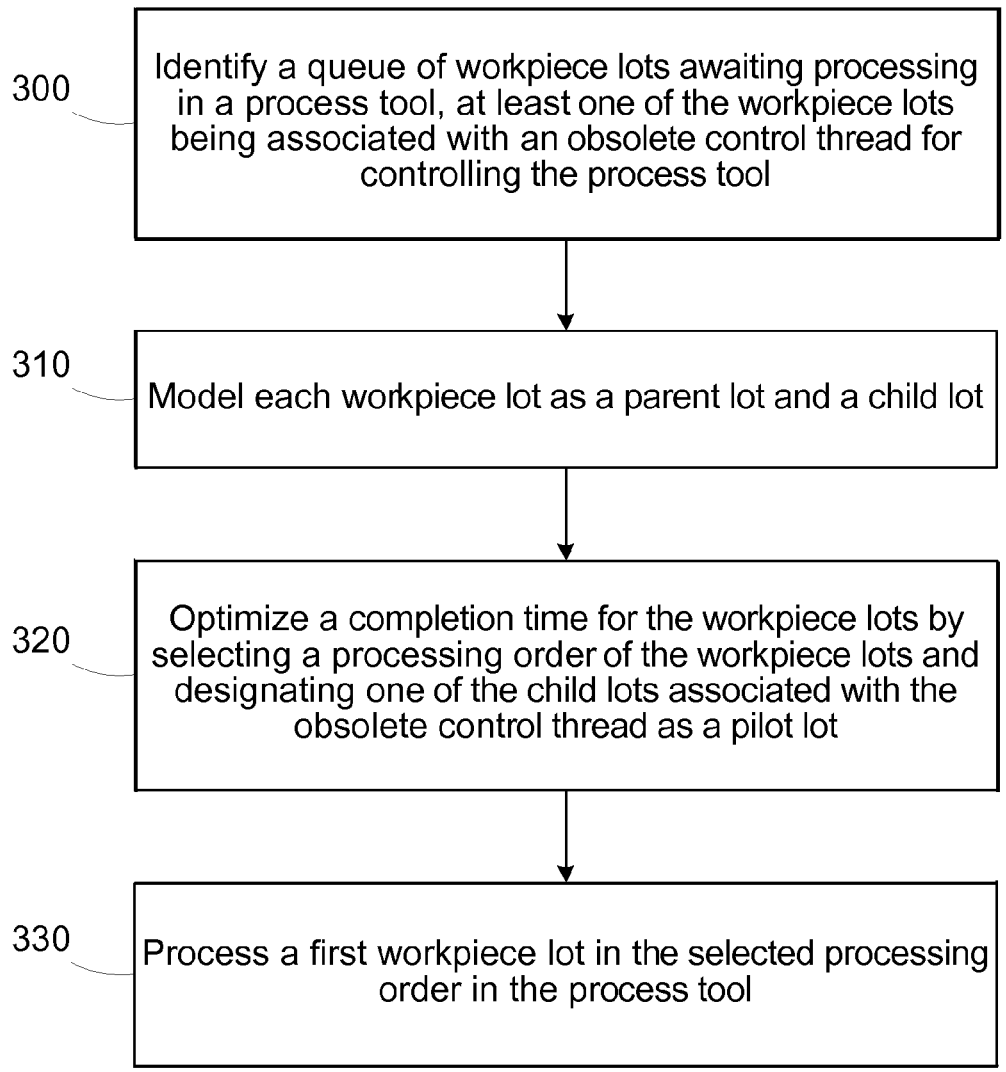
FIG. 3 is a simplified flow diagram of a method for scheduling workpieces in accordance with another illustrative embodiment of the present invention.

Turning now to FIG. 3, a simplified flow diagram of a method for scheduling workpieces is provided. In method block 300, a queue of workpiece lots awaiting processing in a process tool 105 is identified. At least one of the workpiece lots is associated with an obsolete control thread for controlling the process tool 105. Each workpiece lot is modeled as a parent lot and a child lot in method block 310. In method block 320, a completion time for the workpiece lots is optimized by selecting a processing order of the workpiece lots and designating one of the child lots associated with the obsolete control thread as a pilot lot. In method block 330, a first workpiece lot in the selected processing order is processed in the process tool 105.

Selecting the processing order and designating the pilot lot as described above increases the throughput of the process tool while still providing the necessary process control data for updating an obsolete control thread. Lots are processed in an order that incorporates tool setup issues and idle times. Pilot lots do not necessarily receive highest priority if the throughput of the process tool would be increased by processing a different lot first. In cases where the process tool is a bottleneck the amount of non-recoverable capacity loss may be reduced. Such optimization increases overall balance and profitability of the production line.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A method, comprising:
   identifying a queue of workpiece lots awaiting processing in a process tool, at least one of the workpiece lots being associated with an obsolete control thread for controlling the process tool;
   modeling each of the plurality of workpiece lots as a parent lot and a child lot;
   optimizing a completion time for the workpiece lots by selecting a processing order of the workpiece lots and designating one of the child lots associated with the obsolete control thread as a pilot lot; and
   processing a first workpiece lot in the selected processing order in the process tool.

2. The method of claim 1, wherein the first workpiece lot comprises the pilot lot.

3. The method of claim 2, further comprising updating the obsolete control thread based on metrology data collected from the pilot lot after processing in the process tool.

4. The method of claim 3, further comprising placing workpiece lots associated with the obsolete control thread on hold until completion of the updating of the obsolete control thread.

5. The method of claim 4, processing subsequent workpiece lots in the process tool after updating the obsolete control thread.

6. The method of claim 1, wherein the first workpiece lot comprises a workpiece lot other than the pilot lot.

7. The method of claim 1, wherein optimizing the completion time further comprises optimizing the completion time using a mixed integer linear program.

8. The method of claim 1, wherein optimizing the completion time further comprises constraining the parent lot and child lot of a workpiece lot not including the selected pilot lot to be processed together in the process tool.

9. The method of claim 8, wherein optimizing the completion time further comprises allowing the pilot lot and its associated parent lot to be processed separately by the process tool.

10. The method of claim 1, wherein each workpiece lot has an associated tool setup, and optimizing the completion time further comprises incorporating delays associated with changing a setup of the process tool based on the processing order.

11. The method of claim 1, wherein the process tool has a current setup and optimizing the completion time further comprises preventing child lots of workpiece lots having tool setups matching the current setup from being designated as the pilot lot.

12. The method of claim 1, wherein optimizing the completion time further comprises preventing child lots of workpiece lots associated with active control threads from being designated as the pilot lot.

13. The method of claim 1, wherein the workpiece lots comprise semiconductor devices.

14. A method, comprising:
   identifying a of queue workpiece lots awaiting processing in a process tool, at least one of the workpiece lots being associated with an obsolete control thread for controlling the process tool;
   modeling each of the plurality of workpiece lots as a parent lot and a child lot;
   predicting completion times for the workpiece lots;
   selecting one of the child lots associated with the obsolete control thread as a pilot lot based on the predicted completion times; and
   updating the obsolete control thread based on metrology data collected from the pilot lot.

15. The method of claim 14, further comprising:
processing the pilot lot in the process tool; and
collecting the metrology data from at least one of the workpieces in the pilot lot.

16. The method of claim 15, further comprising processing a workpiece lot not associated with the obsolete control thread in the process tool prior to processing the pilot lot.

17. The method of claim 14, further comprising placing workpiece lots associated with the obsolete control thread on hold until completion of the updating of the obsolete control thread.

18. The method of claim 17, processing subsequent workpiece lots in the process tool after updating the obsolete control thread.

19. The method of claim 14, wherein predicting the completion times further comprises predicting completion times based on a processing order of the workpiece lots.

20. The method of claim 14, wherein predicting the completion times further comprises constraining the parent lot and child lot of a workpiece lot not including the selected pilot lot to be processed together in the process tool.

21. The method of claim 14, wherein predicting the completion times further comprises allowing the pilot lot and its associated parent lot to be processed separately by the process tool.

22. The method of claim 14, wherein each workpiece lot has an associated tool setup and predicting the completion times further comprises incorporating delays associated with changing a setup of the process tool.

23. The method of claim 14, wherein the process tool has a current setup and selecting the pilot lot further comprises preventing child lots of workpiece lots having tool setups matching the current setup from being designated as the pilot lot.

24. The method of claim 14, wherein selecting the pilot lot further comprises preventing child lots of workpiece lots associated with active control threads from being designated as the pilot lot.

25. The method of claim 14, predicting the completion times and selecting the pilot lot further comprise employing a mixed integer linear program.

26. The method of claim 14, wherein the workpiece lots comprise semiconductor devices.

27. A system, comprising:

a process tool operable to process a workpiece;

a scheduling unit operable to identify a queue of workpiece lots awaiting processing in the process tool, at least one of the workpiece lots being associated with an obsolete control thread for controlling the process tool, model each of the plurality of workpiece lots as a parent lot and a child lot, optimize a completion time for the workpiece lots by selecting a processing order of the workpiece lots and designating one of the child lots associated with the obsolete control thread as a pilot lot, and direct the process tool to process a first workpiece lot in the selected processing order.

28. A system, comprising:

means for identifying a queue of workpiece lots awaiting processing in a process tool, at least one of the workpiece lots being associated with an obsolete control thread for controlling the process tool;

means for modeling each of the plurality of workpiece lots as a parent lot and a child lot;

means for optimizing a completion time for the workpiece lots by selecting a processing order of the workpiece lots and designating one of the child lots associated with the obsolete control thread as a pilot lot; and means for processing a first workpiece lot in the selected processing order in the process tool.

* * * * *